United States Patent [19]
Krick et al.

[11] Patent Number: 5,638,382
[45] Date of Patent: Jun. 10, 1997

[54] BUILT-IN SELF TEST FUNCTION FOR A PROCESSOR INCLUDING INTERMEDIATE TEST RESULTS

[75] Inventors: Robert F. Krick, Beaverton; Peter J. DesRosier, Portland, both of Oreg.

[73] Assignee: Intel Corporation, Santa Clara, Calif.

[21] Appl. No.: 268,018

[22] Filed: Jun. 29, 1994

[51] Int. Cl.[6] .................................................. G06F 11/00
[52] U.S. Cl. ........................ 371/22.5; 371/22.4; 371/24; 371/25.1
[58] Field of Search ........................ 371/22.1, 22.3, 371/22.5, 25.1, 22.4, 24; 324/158 R; 395/575, 425; 364/200

[56] References Cited

U.S. PATENT DOCUMENTS

| | | | |
|---|---|---|---|
| 4,503,536 | 3/1985 | Panzer | 371/25 |
| 4,635,261 | 1/1987 | Anderson et al. | 371/25 |
| 4,910,735 | 3/1990 | Yamashita | 371/22.4 |
| 5,132,937 | 7/1992 | Tuda et al. | 365/201 |
| 5,144,230 | 9/1992 | Katoozi et al. | 324/158 R |
| 5,157,781 | 10/1992 | Harwood et al. | 395/575 |
| 5,173,906 | 12/1992 | Dreibelbis et al. | 371/22.5 |
| 5,317,711 | 5/1994 | Bourekas et al. | 395/425 |

*Primary Examiner*—Robert W. Beausoliel, Jr.
*Assistant Examiner*—Nadeem Iqbal
*Attorney, Agent, or Firm*—Blakely, Sokoloff, Taylor & Zafman

[57] ABSTRACT

A processor with a built in self test function that provides intermediate self test results is disclosed including at least one logic array and a test circuit for each logic array coupled to generate a logic array signature during a built in self test of the processor. The processor further comprises a set of internal registers including a performance register that stores the logic array signature and a register that stores a pass/fail indication for the built in self test of the processor. The internal registers also store a pass/fail indication for a cache memory built in self test and a pass/fail indication for a constant read only memory built in self test.

12 Claims, 4 Drawing Sheets

BUILT-IN SELF TEST FUNCTION FOR A PROCESSOR INCLUDING INTERMEDIATE TEST RESULTS

BACKGROUND OF THE INVENTION

1. Field of the Invention

The present invention pertains to the field of computer systems. More particularly, this invention relates to a processor having a built-in self test function that provides intermediate results of internal hardware failures.

2. Background

Prior central processing units that are implemented on a single integrated circuit chip typically provide a built-in self test function. Such a built-in self test function usually performs a set of hardware tests on various circuit elements of the central processing unit. In addition, some prior central processing units contain internal cache memories as well as various specialized types of storage arrays. The built-in self test function in such a central processing unit typically performs memory tests on the internal cache memories and verification tests of the preprogrammed arrays.

Such a built in self test function is usually performed upon reset of the central processing unit. Typically, a self test failure during one or more of the internal hardware tests causes the central processing unit to set an error flag. Such an error flag is usually software accessible by code that subsequently executes on the central processing unit. The system software executing by the central processing unit typically interrogates the error flag during system initialization to determine whether a built-in self test error occurred during the built in self test function performed after the previous central processing unit reset.

Unfortunately, such prior central processing units typically provide only an overall pass/fail error flag for the built-in self test. Such an overall error indication usually does not provide specific information on the type or types of central processing unit hardware failures that caused the built-in self test failure. Such a lack of self test error information increases the complexity of verification testing for such a central processing unit during the manufacture test period. Such processors that provide an overall pass/fail error flag for self test must typically be placed into a complex and expensive integrated circuit device tester to obtain a more precise indication of the hardware circuitry that caused the self test failure. Such increased use of expensive hardware testers greatly increases the time required to ascertain hardware failures and greatly increases the overall manufacturing cost of such prior central processing units.

SUMMARY AND OBJECTS OF THE INVENTION

One object of the present invention is to provide a built in self test function for a processor and to provide intermediate results of the self tests.

Another object of the present invention is provide a built in self test function that reports intermediate results of the self tests via internal processor registers.

Another object of the present invention is enable system software to determine built in self test results by accessing the internal registers of the processor.

A further object of the present invention is to provide built in self tests for programmed arrays in the processor while minimizing the circuitry required to implement the programmed array test functions.

Another object of the present invention is minimize the circuitry required to implement the programmed array test functions by implementing linear feed back shift registers to generate programmed array inputs and to sample programmed array outputs.

These and other objects of the invention are provided by a processor comprising at least one logic array preprogrammed to perform a logic function in the processor and a test circuit for each logic array coupled to generate a series of inputs to the logic array and coupled to generate a logic array signature by sampling a series of outputs of the logic array during a built in self test of the processor. The processor further comprises a set of internal registers including a performance register coupled to receive and store the logic array signature and a register coupled to receive and store a pass/fail indication for the built in self test of the processor. The processor further comprises at least one cache memory and circuitry coupled to perform a set of read/write memory tests on the cache memory and coupled to store a pass/fail indication for the cache memory in one of the internal registers. The processor further comprises a constant read only memory that provides a set of constant data values for the processor and circuitry for generating a constant signature for the constant read only memory and for storing a pass/fail indication for the constant read only memory in one of the internal registers.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
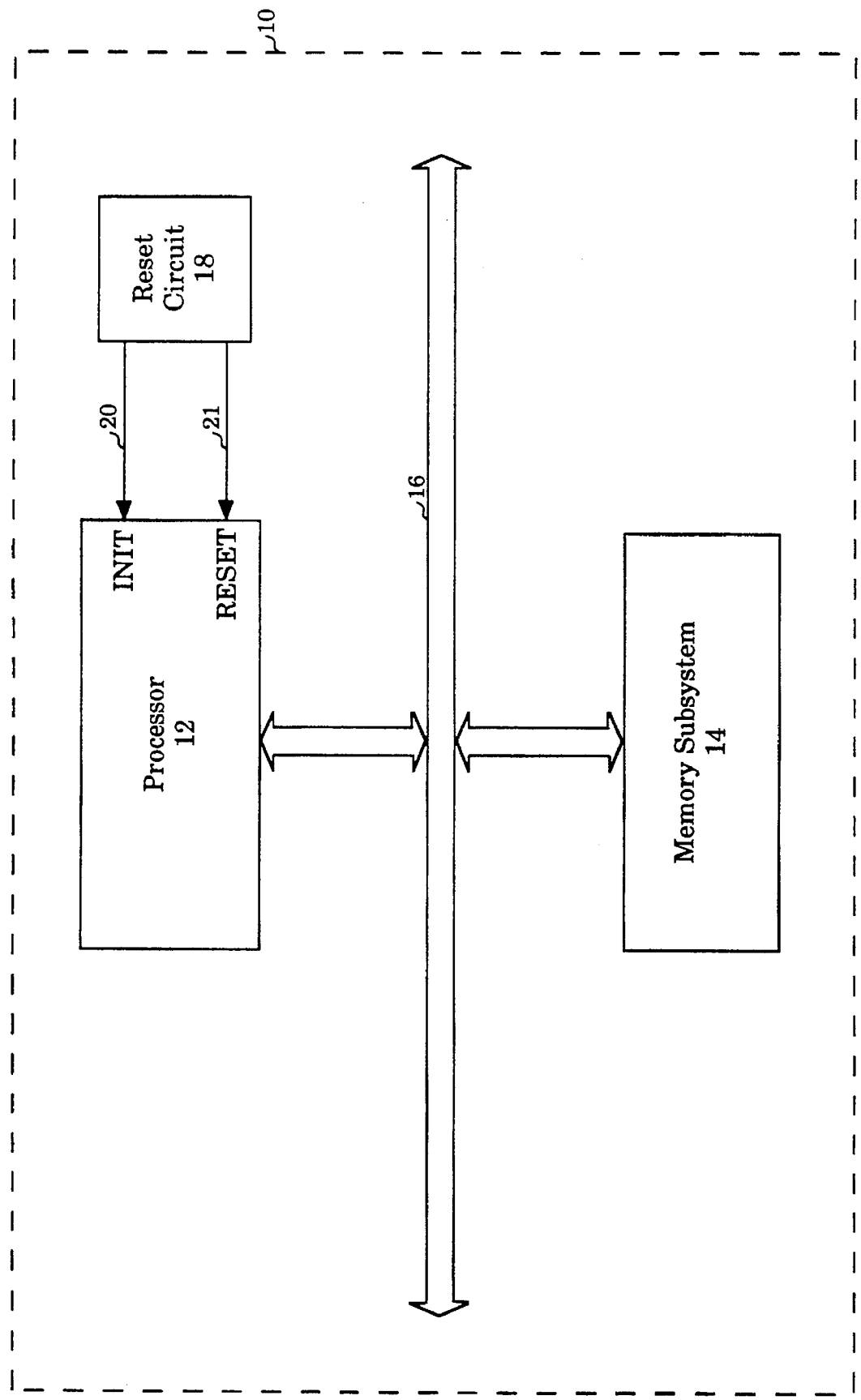
FIG. 1 illustrates a computer system for one embodiment which comprises a memory subsystem, a reset circuit, and a processor coupled to a system bus.

FIG. 1 illustrates a computer system 10 for one embodiment. The computer system 10 comprises a processor 12, a memory subsystem 14, and a reset circuit 18. The processor 12 communicates with the memory subsystem 14 other input/output devices and components (not shown) over a system bus 16.

The processor 12 fetches an instruction stream from the memory subsystem 14 over the system bus 16. The processor 12 executes each instruction in the instruction stream and maintains data structures in the memory subsystem 14. The instruction stream includes system initialization code that interrogates the results of a built in self test function in the processor 12.

The reset circuit 18 resets the processor 12 by asserting a reset signal 21. The reset signal 21 is coupled to a reset pin of the processor 12. The reset signal 21 causes the processor 12 to reset and then fetch an instruction from a fixed memory address over the system bus 16. The fixed address directs the processor 12 to the initialization and start-up code for the computer system 10.

The reset circuit 18 also causes the processor 12 to perform the built-in self test function. The reset circuit 18 invokes the built in self test function by asserting a self test signal 20 on a falling edge of the reset signal 21. The self test signal 20 is received by the processor 12 through an initialization (INIT) pin of the processor 12.

After the reset circuit 18 initiates the built in self test, the processor 12 performs a set of internal self tests while storing intermediate results of the self tests into internal registers of the processor 12. After completion of the built in self, the processor 12 boots up by fetching from the fixed address over the system bus 16 to direct control to the initialization and boot up code for the computer system 10.

The initialization and boot up code for the computer system 10 interrogates the state of the appropriate internal registers of the processor 12 to determine the results of the built-in self test. The internal registers indicate whether the built-in self test passed or failed. The internal registers also indicate particular types of hardware failures internal to the processor 12 and provide a variety of built in self test result information.

Figure 2:
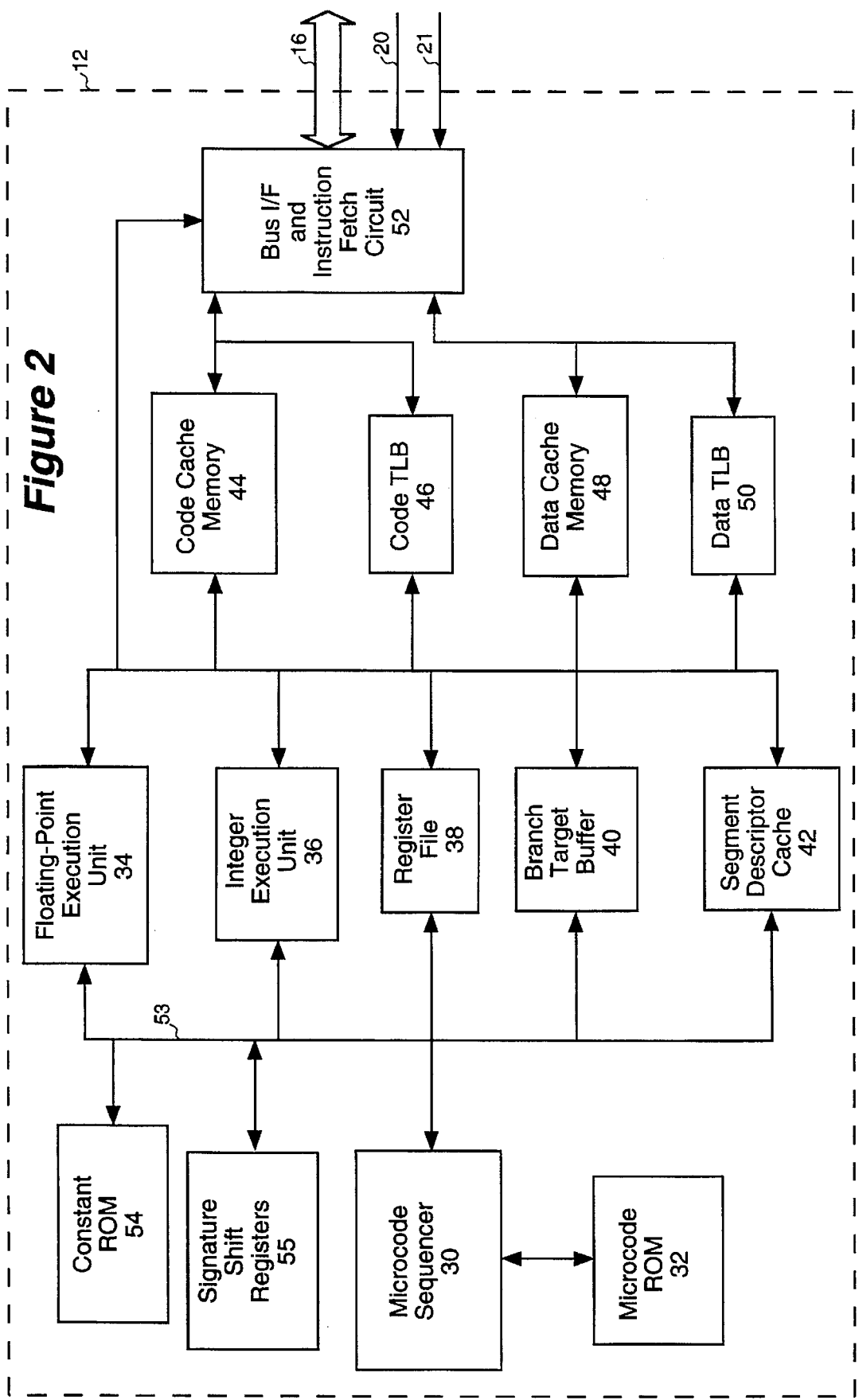
FIG. 2 illustrates a processor for one embodiment which comprises a microcode sequencer, and a micro code read only memory (ROM) that stores code for a built-in self test function and for normal operating functions.

FIG. 2 illustrates the processor 12 for one embodiment. The processor 12 comprises a microcode sequencer 30, and a micro code read only memory (ROM) 32 that control the built-in self test function. The micro code ROM 32 stores internal micro code for the normal operating functions of the processor 12. The micro code ROM 32 also stores a set of routines for performing the built-in self test functions of the processor 12.

The processor 12 further comprises a floating point execution unit 34 and an integer execution unit 36. The floating point execution unit 34 executes floating point instructions from the instruction stream fetched over the system bus 16. The integer execution unit 36 executes integer instructions fetched over the system bus 16. The floating point execution unit 34 and the integer execution unit 36 each contain a set of preprogrammed programmable logic arrays. The internal programmable logic arrays of the floating point execution unit 34 and the integer execution unit 36 provide preprogrammed hardware functions for executing the corresponding instructions.

Each programmable logic array in the floating point execution unit 34 and the integer execution unit 36 includes self test circuitry for verifying the programmed contents of the programmable logic arrays. The microcode sequencer 30 communicates with the self test circuitry of the programmable logic arrays via a communication path 53 to initiate self tests on the programmable logic arrays.

The processor 12 further comprises a register file 38, a branch target buffer 40, and a segment descriptor cache 42. The register file 38 contains internal registers for the processor 12. For one embodiment, the register file 38 provides a set of internal registers according to the Intel Microprocessor Architecture. The register file 38 also contains a performance counter A register and a performance counter B register for storing intermediate results of the built in self test function of the processor 12.

The microcode sequence 30 stores intermediate results for the built-in self test function of the processor 12 in registers contained the register file 38. The initialization and boot up software for the computer system 10 interrogates the appropriate internal registers in the register file 38 to determine the results of the built-in self test function. The register file 38 also contains a set of micro code registers that are accessible by the microcode sequencer 30. The micro code registers contain additional information for built-in self test failures.

The branch target buffer 40 stores branch addresses according to a branch prediction function implemented in the processor 12. The segment descriptor cache 42 stores a set of segment descriptors for a memory management function according to the Intel Microprocessor Architecture.

The branch target buffer 40 and the segment descriptor cache 42 are each implemented as a static random access memory (SRAM). The microcode sequencer 30 performs built-in self test functions that test the branch target buffer 40 and the segment descriptor cache 42 SRAMs. The built-in self test functions on the branch target buffer 40 and the segment descriptor cache 42 SRAMs include checkerboard memory tests. The microcode sequencer 30 stores intermediate results of the SRAM tests of the branch target buffer 40 and the segment descriptor cache 42 into internal registers in the register file 38 for subsequent examination.

The processor 12 further comprises a code cache memory 44, a code translation look aside buffer (TLB) 46, a data cache memory 48, and a data TLB 50. The code cache memory 44 provides an internal instruction cache for the processor 12. The code TLB 46 provides internal storage for a instruction memory management mechanism of the processor 12. The data cache memory 48 provides an internal data cache memory for the processor 12. The data TLB 50 provides an internal storage area for a data memory management mechanism for the processor 12. For one embodiment, the code cache memory 44, the code TLB 46, the data cache memory 48, and the data TLB 50 are each implemented as SRAM memories.

The microcode sequencer 30 executes built-in test functions from the microcode sequencer 30 that perform memory tests on the code cache memory 44, the code TLB 46, the data cache memory 48, and the data TLB 50. The microcode sequencer 30 performs checkerboard write/read functions on the code cache memory 44, the code TLB 46, the data cache memory 48, and the data TLB 50 SRAMs. The checkerboard write/read memory functions detect integrated circuit die defects in adjacent SRAM cells in each of the code cache memory 44, the code TLB 46, the data cache memory 48, and the data TLB 50.

The processor 12 further comprises a bus interface (I/F) and instruction fetch circuit 52. The bus interface and instruction fetch circuit 52 interfaces the processor 12 to the system bus 16. The bus interface and instruction fetch circuit 52 also senses the state of the reset signal 21 and the self test signal 20.

The bus interface and instruction fetch circuit 52 fetches instructions from the memory subsystem 14 over the system bus 16. The bus interface and instruction fetch circuit 52 also enables communication between the code cache memory 44, the data cache memory 48, and the memory subsystem 14 over the system bus 16.

The processor 12 further comprises a constant read only memory (ROM) 54. The constant ROM 54 stores a set of constant data values used by various portions of the processor 12 including the floating-point execution unit 34 and the integer execution unit 36. The microcode sequencer 30 determines a test signature for the constant ROM 54 by performing an exclusive-or (XOR) function of all the constant data values stored in the constant ROM 54.

The processor 12 further comprises a set of signature shift registers 55. The signature shift registers 55 sample serial signature signals from the self test circuitry corresponding to each programmable logic array of the processor 12. An accumulation of the signatures for the programmable arrays in the processor 12 is stored in a register of the register file 38 during the built-in self test function of the processor 12.

Figure 3:
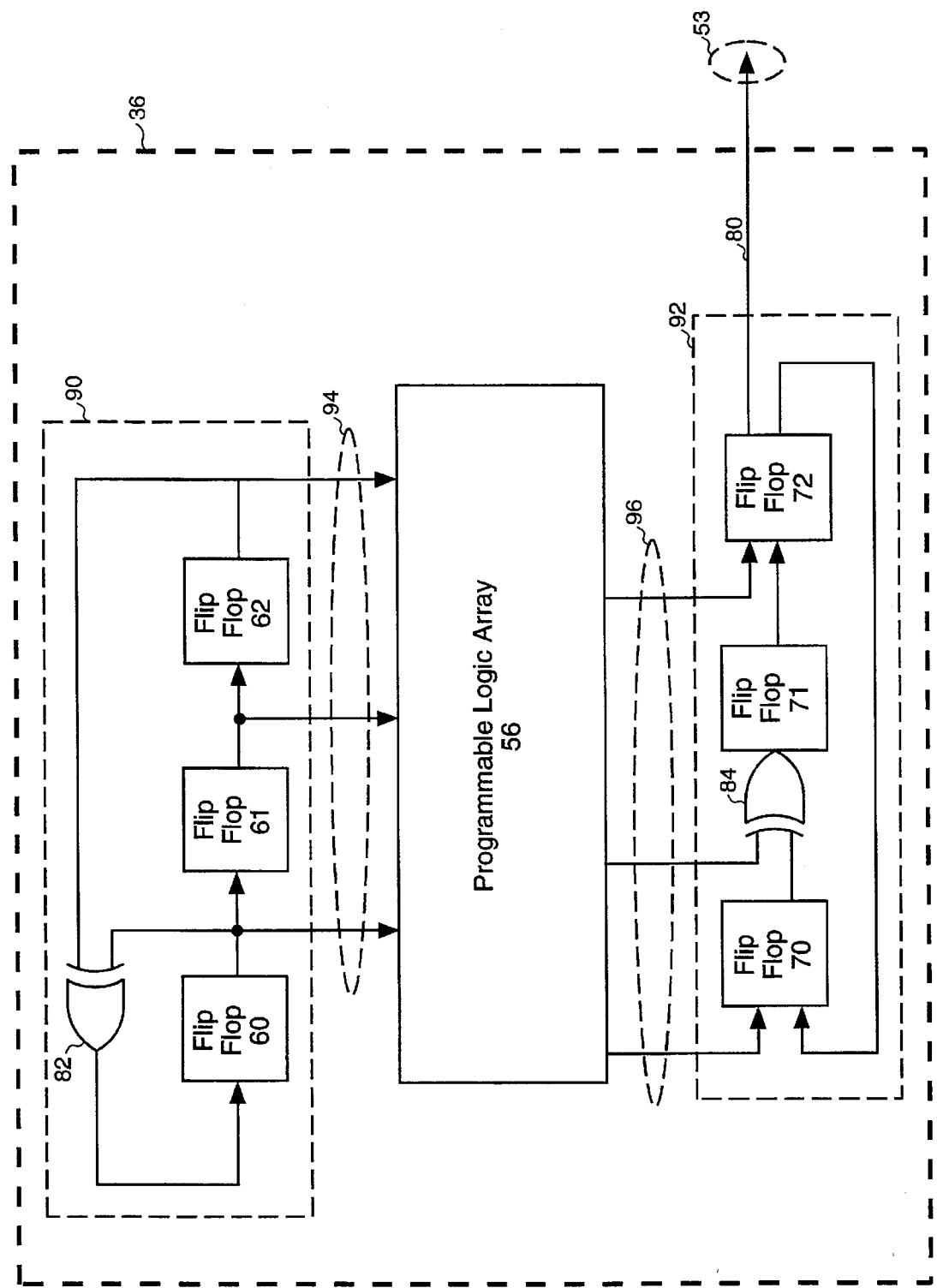
FIG. 3 illustrates a set of built-in self test circuitry for a programmable logic array implemented in the processor.

FIG. 3 illustrates a set of built-in self test circuitry for a programmable logic array 56 implemented in the processor 12. For one embodiment, the processor 12 contains six programmable logic arrays such as the programmable logic array 56 and a set of similar built in self test circuitry.

The built-in self test circuitry for the programmable logic array 56 comprises an input linear feedback shift register (LFSR) 90 and a signature LFSR 92. The input LFSR 90 generates a set of inputs 94 for the programmable logic array 56. The signature LFSR 92 samples a set of outputs 96 from the programmable logic array 56. The input LFSR 90 generates a series of inputs to the programmable logic array 56, and the signature LFSR 92 generates a signature 80 corresponding to the series of inputs generated by the input LFSR 90.

Each programmable logic array in the processor 12 includes a corresponding input LFSR and a corresponding signature LFSR. The input LFSR for each programmable logic array generates the number of inputs required by the corresponding programmable logic array. The signature LFSR for each programmable logic array samples the number of outputs generated by the corresponding programmable logic array. If a particular programmable logic array comprises N inputs, then the corresponding input LFSR generates $2^N$ states at the corresponding inputs to the programmable logic array.

The LFSRs employed to test the programmed arrays in the processor 12 require much less integrated circuit die space for implementation in comparison to counter circuits which would perform a function similar to an input LFSR. The use of counters on the inputs and verification arrays on the outputs of the programmed arrays would make the die space cost of the programmed array self test function prohibitive.

For the example programmable logic array 56, the input LFSR 90 generates the inputs 94 comprising a set of three inputs. The input LFSR 90 cycles through a series of $2^3$ input states at the inputs 94 during the built in self test of the programmable logic array 56.

The input LFSR comprises a set of flip flops 60–62 and an exclusive-or gate 82. The exclusive-or gate 82 provides a linear feedback path from an output of the flip flop 62 to an input of the flip flop 60.

The signature LFSR 92 comprises a set of flip flops 70–72 and an exclusive-or gate 84. The signature LFSR 92 includes a feedback loop between an output of the flip flop 72 and an input of the flip flop 70. The signature LFSR 92 generates the signature signal 80 by sampling the outputs 96 from the programmable logic array 56 as the input LFSR 90 generates the series of $2^3$ input states at the inputs 94 to the programmable logic array 56.

Before a self test of cycle on the programmable logic array 56 begins, the flip flops 60–62 are initialized to a predetermined value. Thereafter, the input LFSR 90 generates the $2^3$ values of the inputs 94 while the signature LFSR 92 samples the outputs 96 and generates the serial signature signal 80.

The serial signature 80 is transferred to the signature shift registers 55 via the data path 53. The signature shift registers 55 sample the serial signature signal 80 to generate a final signature for the programmable logic array 56. The signature shift registers 55 also sample the signatures from all the output LFSRs corresponding to the programmed arrays of the processor 12.

The microcode sequencer 30 determines an accumulated signature from the sampled signatures stored in the signature registers 55. If the accumulated signature does not equal a predetermined accumulated signature for the programmed arrays in the processor 12, then the microcode sequencer 30 indicates a built in self test error by setting a flag in the register file 38. The predetermined accumulated signature for all the programmed arrays of the processor 12 is empirically determined according to the preprogrammed contents of the programmable arrays.

Figure 4:
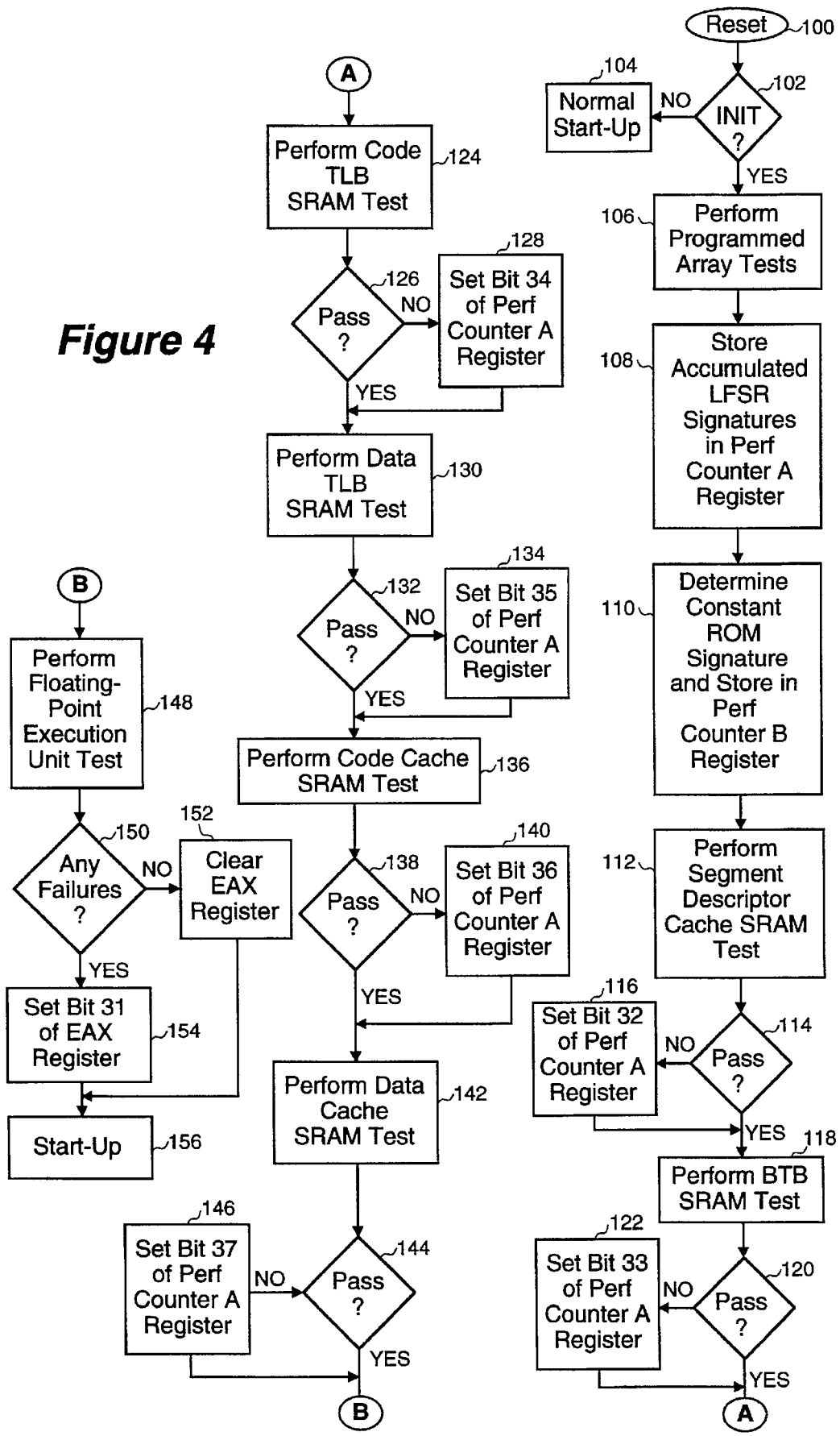
FIG. 4 is a flow diagram illustrating the built-in self test function of the processor for one embodiment.

FIG. 4 is a flow diagram illustrating the built-in self test function of the processor 12. At state 100, the reset circuit 18 asserts the reset signal 21 to reset the processor 12. Thereafter, on the falling edge of the reset signal 21 the processor 12 determines whether the INIT pin is asserted. If the INIT pin is not asserted at decision state 102, then control proceeds to block 104. At block 104, the processor 12 performs a normal start-up by fetching at the fixed address.

If the INIT pin is asserted at decision block 102, then control proceeds to block 106. At block 106, the processor 12 performs the programmed array signature tests on all the programmable logic arrays in the processor 12. The programmed array tests are performed by the input LFSR and the signature LFSR corresponding to each programmable logic array. The input LFSRs are initialized and then cycled through the corresponding $2^N$ states as the corresponding signature LFSRs generate the serial signatures for sampling by the signature shift registers 55.

Thereafter at block 108, the microcode sequencer 30 reads the accumulated LFSR signatures from the signature shift registers 55. The microcode sequencer 30 stores the accumulated LFSR signatures in the performance counter A register in the register file 38. The microcode sequencer 30 compares the accumulated signature to the predetermined signature for the programmed arrays of the processor 12 to detect programmed array failures.

At block 110, the microcode sequencer 30 determines a signature for the constant ROM 54. For one embodiment, the microcode sequencer 30 determines the signature for the constant ROM 54 by performing an exclusive-or function on all of the values stores in the constant ROM 54. The microcode sequencer 30 stores the constant ROM signature in the performance counter B register in the register file 38. The microcode sequencer 30 compares the constant ROM signature to a predetermined signature for the constant ROM 54 to detect constant ROM 54 failures.

At block 112, the microcode sequencer 30 performs an SRAM test on the segment descriptor cache 42. The microcode sequencer 30 tests the segment descriptor cache 42 by performing a series of read/write tests on the segment descriptor cache 42 using checkerboard patterns to test adjacent SRAM cells in the segment descriptor cache 42. At decision block 114, if the segment descriptor cache SRAM test did not pass then control proceeds to block 116. At block 116, the microcode sequencer 30 sets bit 32 of the performance counter A register in the register file 38. Thereafter, control proceeds to block 118. At decision block 114, if the segment descriptor cache SRAM test passed then control proceeds to block 118.

At block 118, the microcode sequencer 30 performs SRAM tests on the branch target buffer (BTB) 40. The SRAM tests on the BTB 40 comprise a series of read/write checkerboard patterns the BTB 40 SRAM. Thereafter, if the BTB SRAM test did not pass at decision block 120, then control proceeds to block 122. At block 122, the microcode sequencer 30 sets bit 33 of the performance counter A register in the register file 38. If the BTB SRAM test did pass at decision block 120, then control proceeds to block 124.

At block 124, the microcode sequencer 30 performs an SRAM test on the code TLB 46. If the SRAM test on the code TLB 46 did not pass at decision block 126, then the microcode sequencer 30 sets bit 34 of the performance counter A register in the register file 38 at block 128. If the code TLB 46 SRAM test passed at decision block 126, then control proceeds to block 130.

At block 130, the microcode sequencer 30 performs an SRAM test on the data TLB 50. If the data TLB SRAM test failed at decision block 132, then control proceeds to block 134. At block 134, the microcode sequencer 30 sets bit 35 of the performance counter A register in the register file 38 and then control proceeds to block 136. If the data TLB SRAM test passed at decision block 132, then control proceeds to block 136.

At block 136, the microcode sequencer 30 performs an SRAM test on the code cache memory 44. If the code cache memory SRAM test failed at decision block 138, then the microcode sequencer 30 sets bit 36 of the performance counter A register in the register file 38. Otherwise control proceeds to block 142.

At block 142, the microcode sequencer 30 performs an SRAM test on the data cache memory 48. If the SRAM test on the data cache memory 48 did not pass at decision block 144, then the microcode sequencer 30 sets bit 37 of the performance counter A register in the register file 38 at block 146. Otherwise control proceeds to block 148.

At block 148, the microcode sequencer 30 performs a test on the floating point execution unit 34. The floating point execution unit test generates a result value which is stored in the EAX register of the register file 38.

At decision block 150, the microcode sequencer 30 determines whether any failures occurred during the built in self tests performed between blocks 106 and 148. If no failures occurred between blocks 106 and 148, then control proceeds to block 152. At block 152, the microcode sequencer 30 clears the EAX register in the register file 38 to indicate that the built-in self test passed for the processor 12. Control then proceeds to block 156 for a normal start-up of the processor 12.

If at least one failure did occur between blocks 106 and 148 at decision block 150, then control proceeds to block 154. At block 154, the microcode sequencer 30 sets bit 31 of the EAX register of the processor 12 in the register file 38. Control then proceeds to block 156. At block 156 the processor 12 fetches from the fixed address to perform a normal start-up.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A processor, comprising:

a plurality of logic arrays, wherein each one of the logic arrays is preprogrammed to perform a logic function in the processor;

a plurality of logic array test circuits, wherein each one of the logic array test circuits is coupled to a corresponding one of the logic arrays to generate a series of inputs to the corresponding one of the logic arrays and coupled to generate a logic array signature by sampling a series of outputs of the corresponding one of the logic arrays during a built in self test of the processor;

memory circuitry;

memory test circuitry coupled to perform a set of write/read memory tests on the memory circuitry; and a set of internal registers in the processor including a first performance register coupled to receive and store an accumulated logic array signature determined from the series of outputs, the first performance register further configured to receive and store intermediate test results of the built in self test of the processor, the intermediate test results including a pass/fail indication for the memory circuitry, the set of internal registers further including a register coupled to receive and store a pass/fail indication for the built in self test of the processor.

2. The processor of claim 1, further comprising:

constant read only memory that stores a set of constant data values for the processor;

circuitry for generating a constant signature for the constant read only memory and coupled to store a pass/fail indication for the constant read only memory in one of the internal registers.

3. The processor of claim 2, wherein the circuitry for generating a constant signature performs an exclusive-or function of the constant data values to generate the constant signature.

4. The processor of claim 2, further comprising circuitry for storing the constant signature in a second performance register of the internal registers.

5. The processor of claim 1, further comprising:

segment descriptor cache memory in the memory circuitry for storing a set of segment descriptors for a memory management function of the processor;

circuitry in the memory test circuitry coupled to perform a set of write/read memory tests on the segment descriptor cache memory and coupled to store a pass/fail indication for the segment descriptor cache memory in the first performance register.

6. The processor of claim 1, further comprising:

translation lookaside buffer in the memory circuitry that stores a set of data for a memory management function of the processor;

circuitry in the memory test circuitry coupled to perform a set of write/read memory tests on the translation lookaside buffer and coupled to store a pass/fail indication for the translation lookaside buffer in the first performance register.

7. A method for built in self test of a processor, comprising the steps of:

generating a series of inputs to a plurality of logic arrays that perform preprogrammed logic functions in the processor with a plurality of logic array test circuits, wherein each one of the logic array test circuits is coupled to a corresponding one of the logic arrays to generate the series of inputs;

generating a plurality of logic array signatures with said each one of the plurality of logic array test circuits by sampling a series of outputs of the plurality of logic arrays during the series of inputs to the logic arrays, wherein each said one of the logic array test circuits is coupled to the corresponding one of the logic arrays to generate the plurality of logic array signatures;

storing an accumulated logic array signature determined from said generated logic array signatures in a first performance register in the processor;

performing a set of write/read memory tests on memory circuitry in the processor, the built in self test including the set of write/read memory tests on the memory circuitry; and storing intermediate results of the built in self test in the first performance register in the processor and storing a pass/fail indication for the built in self test of the processor, the intermediate results including a pass/fail indication for the memory circuitry.

8. The method of claim 7, further comprising the steps of generating a constant signature for a constant read only memory in the processor and storing a pass/fail indication for the constant read only memory in an internal register of the processor.

9. The method of claim 8, wherein the step of generating a constant signature includes the step of performing an exclusive-or function on a set of constant data values stored in the constant read only memory.

10. The method of claim 8, further comprising the step of storing the constant signature in a second performance register of the processor.

11. The method of claim 7, further comprising the steps of performing a set of write/read memory tests on a segment descriptor cache memory in the memory circuitry that stores a set of segment descriptors for a memory management function of the processor and storing a pass/fail indication for the segment descriptor cache memory in the first performance register of the processor.

12. The method of claim 7, further comprising the steps of performing a set of write/read memory tests on the translation lookaside buffer in the memory circuitry that stores a set of data for a memory management function of the processor and storing a pass/fail indication for the translation lookaside buffer in the first performance register of the processor.

* * * * *